United States Patent [19]
Matono et al.

[11] Patent Number: 5,609,971
[45] Date of Patent: Mar. 11, 1997

[54] THIN FILM MAGNETIC HEAD

[75] Inventors: Naoto Matono, Kadoma; Hitoshi Noguchi, Higashiosaka; Tomomi Yamamoto; Shinji Kobayashi, both of Hirakata; Masahiro Nakata, Osaka, all of Japan

[73] Assignee: Sanyo Electric Co., Ltd., Osaka, Japan

[21] Appl. No.: 264,918

[22] Filed: Jun. 24, 1994

[30] Foreign Application Priority Data

Jun. 24, 1993 [JP] Japan ................................. 5-153673
Oct. 5, 1993 [JP] Japan ................................. 5-249331

[51] Int. Cl.⁶ ............................ G11B 5/66; G11B 5/147; B32B 9/00
[52] U.S. Cl. .................... 428/692; 428/668; 428/679; 428/694 R; 428/694 T; 428/694 TM; 428/900; 360/126
[58] Field of Search ............................ 360/126; 428/668, 428/679, 692, 694 R, 694 T, 694 TM, 900

[56] References Cited

U.S. PATENT DOCUMENTS

| 4,190,872 | 2/1980 | Jones et al. | 360/125 |
|---|---|---|---|
| 4,504,880 | 3/1985 | Church et al. | 360/113 |
| 5,038,334 | 2/1982 | Mallary | 428/336 |
| 5,085,335 | 2/1992 | Mallary | 428/336 |
| 5,132,858 | 7/1992 | Andricacos | 360/113 |
| 5,264,981 | 11/1993 | Campbell | 360/126 |
| 5,384,680 | 1/1985 | Mellary | 360/126 |

FOREIGN PATENT DOCUMENTS

| 55-101124 | 8/1980 | Japan . |
|---|---|---|
| 1-201812 | 8/1989 | Japan . |
| 2-81409 | 3/1990 | Japan . |

Primary Examiner—Leszek Kiliman
Attorney, Agent, or Firm—Nikaido, Marmelstein, Murray & Oram LLP

[57] ABSTRACT

A thin film magnetic head comprising a lower magnetic core layer 9 and an upper magnetic core layer 12 formed over the core layer 9 with a coil layer 10, a gap spacer layer 11 and an insulating layer provided therebetween, the core layers 9 and 12 each having a core tip region c between a core tip a and a portion b increasing in core width. The core layers 9 and 12 are each formed by a magnetic thin film of NiFe having a positive magnetostriction constant of not greater than $1 \times 10^{-6}$ in absolute value and containing 17.5 to 19.5 wt. % of Fe.

5 Claims, 7 Drawing Sheets

PRIOR ART

THIN FILM MAGNETIC HEAD

FIELD OF THE INVENTION

The present invention relates to thin film magnetic heads for use in magnetic recording devices.

BACKGROUND OF THE INVENTION

In the field of magnetic recording devices, recording has been accomplished at ever-increasing densities in recent years, and thin film magnetic heads are in use for recording and reproduction. For example, a thin film of Permalloy comprising Ni and Fe is widely used as a magnetic thin film for forming the magnetic core layer of such thin film magnetic heads. It is required that the magnetic thin film for forming the magnetic core layer have excellent soft magnetic properties, especially high magnetic permeability at high frequencies, so as to exhibit improved switching characteristics at high frequencies.

Generally, high magnetic permeabilities can be obtained effectively by imparting uniaxial magnetic anisotropy to the magnetic thin film so that the direction of track width of the magnetic gap becomes the direction of easy axis of magnetization. The magnetic thin film is given uniaxial magnetic anisotropy when formed as subjected to an external magnetic field.

Further for controlling the uniaxial magnetic anisotropy, it is suitable to form magnetic thin films having a negative magnetostriction constant in the range of $-1\times10^{-6}$ to $-5\times10^{-6}$ as is already known. For example, Unexamined Japanese Patent Publication HEI 1-201812 discloses that the magnetostriction constant of the magnetic thin film is made smaller than $-5\times10^{-6}$. Unexamined Japanese Patent Publication SHO 55-101124 discloses the reason for this; since tensile stress acts on the magnetic thin film in the direction of width of the track, the tensile stress hinders magnetization rotation with the result that the direction of easy axis of magnetization becomes the direction of width of the track.

Unexamined Japanese Patent Publication HEI 2-81409 discloses that for forming an NiFe thin film having excellent magnetic properties by the conventional common sputtering method or magnetron sputtering method, it is useful to limit the Fe content to the range of 16.5 to 17.5 wt. %.

However, difficulty is encountered in recent years in controlling the magnetic anisotropy by stress because thin film magnetic heads are diminished to not greater than 10 μm in track width and are consequently reduced to not greater than several micrometers in the depth of the magnetic gap. Further with thin film magnetic heads of the composite type wherein a magneto-resistive head is formed before an inductive magnetic head is formed, the magnetic thin film of the inductive magnetic head is subjected to complex stresses.

The NiFe thin film of the above-mentioned composition is excellent as a magnetic core material in that it has a high magnetic permeability and a small coercive force, but the thin film is not suited to high-density recording because the low Fe content leads to a small saturation magnetic flux density and renders the magnetic core layer liable to saturation during recording.

SUMMARY OF THE INVENTION

An object of the present invention which has been accomplished in view of the foregoing drawbacks of the prior-art examples is to provide a thin film magnetic head having a structure wherein the direction of easy axis of magnetization in a magnetic core tip region can be made the direction of width of the track, and magnetic saturation is suppressed in the core tip region.

The present invention provides a first thin film magnetic head which comprises a lower magnetic core layer and an upper magnetic core layer formed over the lower magnetic core layer with a coil layer, a gap spacer layer and an insulating layer provided therebetween, at least one of the lower magnetic core layer and the upper magnetic core layer having a core tip region between a core tip and a portion increasing in core width, the thin film magnetic head being characterized in that the magnetic core layer having the core tip region is formed by a magnetic thin film of NiFe having a positive magnetostriction constant of not greater than $1\times10^{-6}$ in absolute value.

The first thin film magnetic head of the present invention is further characterized in that the magnetic thin film of NiFe has an Fe content in the range of 17.5 to 19.5 wt. %.

The first thin film magnetic head of the present invention is further characterized in that the magnetic thin film of NiFe has a crystal structure oriented along <111>.

The first thin film magnetic head of the present invention is further characterized in that the core tip region has a 180° domain wall.

The present invention also provides a second thin film magnetic head which comprises a lower magnetic core layer and an upper magnetic core layer formed over the lower magnetic core layer with a coil layer, a gap spacer layer and an insulating layer provided therebetween, at least one of the lower magnetic core layer and the upper magnetic core layer having a core tip region between a core tip and a portion increasing in core width, the thin film magnetic head being characterized in that the magnetic core layer having the core tip region is formed by a CoZr amorphous magnetic thin film having an anisotropic magnetic field of at least 10 Oe.

The second thin film magnetic head of the present invention is further characterized in that the anisotropic magnetic field is in the range of 13 to 20 Oe.

The second thin film magnetic head of the present invention is further characterized in that the core tip region has a 180° domain wall.

When the magnetic core layer is formed by a magnetic thin film of NiFe having a magnetostriction constant which is positive and not greater than $1\times10^{-6}$ in absolute value as in the first thin film magnetic head described, the direction of easy axis of magnetization in the core tip region becomes parallel to the direction of the track width, permitting a magnetic flux to flow in the direction of hard axis of magnetization, so that the portion is given a higher magnetic permeability and reduced magnetic resistance and is less prone to magnetic saturation.

Furthermore, the NiFe magnetic thin film has an Fe content in the range of 17.5 to 19.5 wt. % and is therefore higher in Fe content and greater in saturation magnetic flux density than the conventional NiFe magnetic thin film.

When the magnetic core layer is formed by a CoZr amorphous magnetic thin film of great anisotropic magnetic field as in the second thin film magnetic head described, the direction of easy axis of magnetization in the core tip region becomes parallel to the direction of the track width to preferentially form a 180° domain wall even in the case where the width of the core tip region of the magnetic core layer, i.e., the track width, is smaller than in the first thin film magnetic head. Accordingly, the core layer has a structure close to a single-domain structure, hence suppressed magnetic saturation.

BRIEF DESCRIPTION OF THE DRAWINGS

FIGS. 5, (a) and (b) are plan views each showing the magnetic domain structure of a magnetic core layer;

DETAILED DESCRIPTION OF EMBODIMENTS

A first embodiment of the invention will be described first in detail with reference to the drawings concerned.

Figure 1:
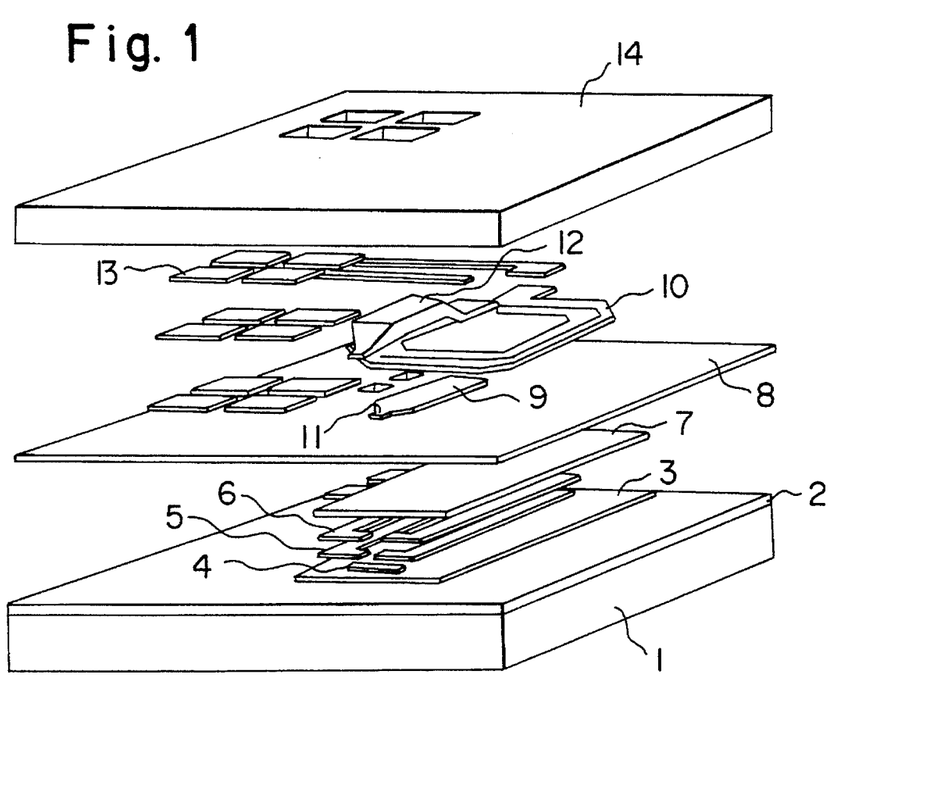
FIG. 1 is an exploded perspective view of a composite-type thin film magnetic head embodying the invention.

FIG. 1 is an exploded perspective view of a composite-type thin film magnetic head as a first embodiment.

Indicated at 1 in the drawing is a substrate of $Al_2O_3$-TiC or the like, at 2 an insulating layer formed on the substrate 1 and made of $Al_2O_3$ or the like, at 3 a lower shield layer formed on the insulating layer 2 and made of NiFe or the like, at 4 an MR element layer formed on the lower shield layer 3 with an insulating layer provided therebetween and made of NiFe or the like, at 5 an electrode layer formed on the MR element layer 4 and on the insulating layer and made of Cu, Au or the like, at 6 a shunt bias layer formed over the electrode layer 5, and at 7 an upper shield layer formed over an insulating layer and made of NiFe or the like. These layers provide a magnetoresistive head portion.

Indicated at 8 is a separating layer made of $SiO_2$ or the like for separating the above magnetoresistive head portion from the inductive thin film magnetic head portion to be described below. The layer 8 provides a flat surface for forming the inductive head portion thereon.

Indicated at 9 is a lower magnetic core layer formed on the separating layer 8 and made of NiFe, at 10 a coil layer made of Cu or the like and formed on the lower magnetic core layer 9 with an insulating layer provided therebetween, at 11 a gap spacer layer formed on the core layer 9 and made of $SiO_2$ or the like, at 12 an upper magnetic core layer made of NiFe and formed above the lower magnetic core layer with the coil layer 10, gap spacer layer 11 and insulating layer provided therebetween, and at 13 an electrode layer formed on the coil layer 10. The inductive thin film magnetic head portion is formed by these layers.

Figure 2:
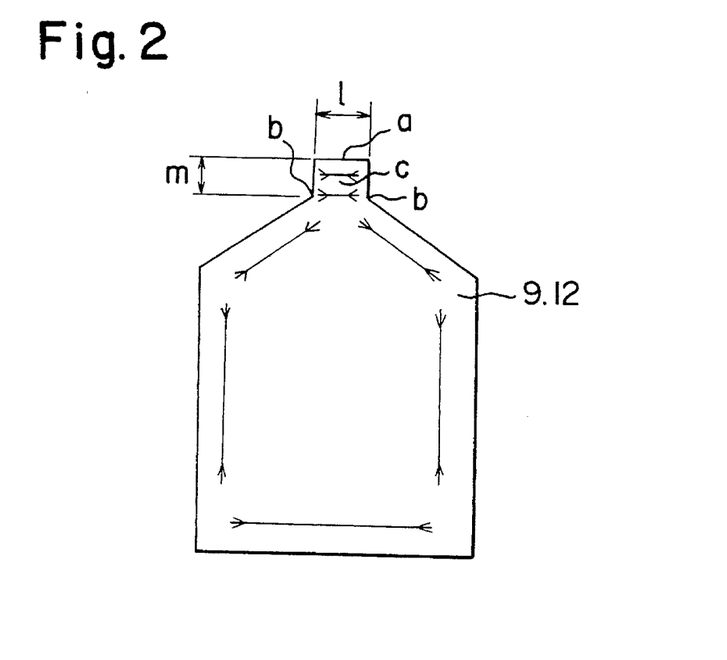
FIG. 2 is a plan view of a magnetic core layer included in the magnetic head.

With reference to FIG. 2, the lower magnetic core layer 9 and the upper magnetic core layer 12 each have a core tip region c between a core tip a and a portion b increasing in core width. The gap spacer layer 11 is present between the core tip region c of the lower magnetic core layer 9 and the core tip region c of the upper magnetic core layer 12. With the present embodiment, the core tip regions c have a width l which is equal to the track width and 6 to 10 µm, and a length m which is equal to the gap depth and 2 µm.

A protective layer 14 of $Al_2O_3$ or the like is formed over the thin film magnetic head portion. The protective layer 14 is 30 to 40 µm in thickness and has a compressive stress of less than $10\times10^8$ dyne/cm² remaining therein. Accordingly, the stress exerted on the upper magnetic core layer 12 acts in compressing directions along the core periphery as shown in FIG. 2.

Next, a sputtering process will be described below by which the lower and upper magnetic core layers 9 and 12 are formed in a magnetic field in preparing the inductive thin film magnetic head portion of the composite-type thin film magnetic head according to the above embodiment.

Figure 3:
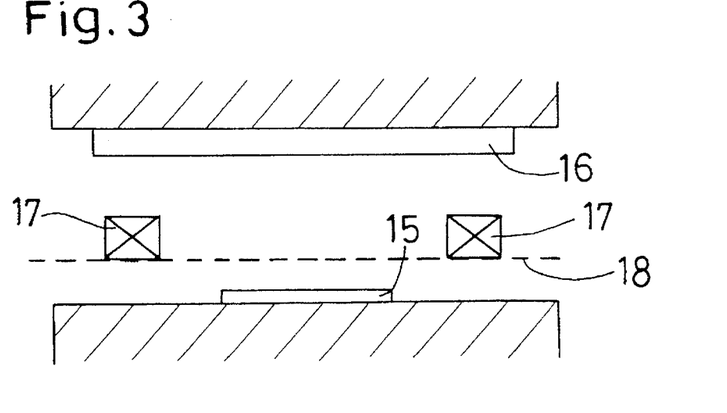
FIG. 3 is a front view partly broken away and schematically showing the construction of a sputtering apparatus wherein a magnetic field is used according to the invention.

FIG. 3 is a diagram schematically showing the construction of an apparatus for practicing the magnetic field sputtering process.

The diagram shows a substrate 15 for forming the magnetic core layer thereon, a target 16 comprising Ni and Fe, and a permanent magnet 17 for setting up a magnetic field of about 70 to 100 Oe in parallel to the substrate 15. Interposed between the substrate 15 and the target 16 is a reticular grounding electrode 18 having 3 to 20 openings per inch for preventing plasma from being drawn to the surface of the substrate 15 by the magnetic field, whereby the plasma is confined. A discharge is effected with the substrate 15 shielded from the plasma. The sputtering conditions used are, for example, applied power of 500 W, Ar gas pressure of 1 mTorr and the substrate-target distance of 50 mm.

Figure 4:
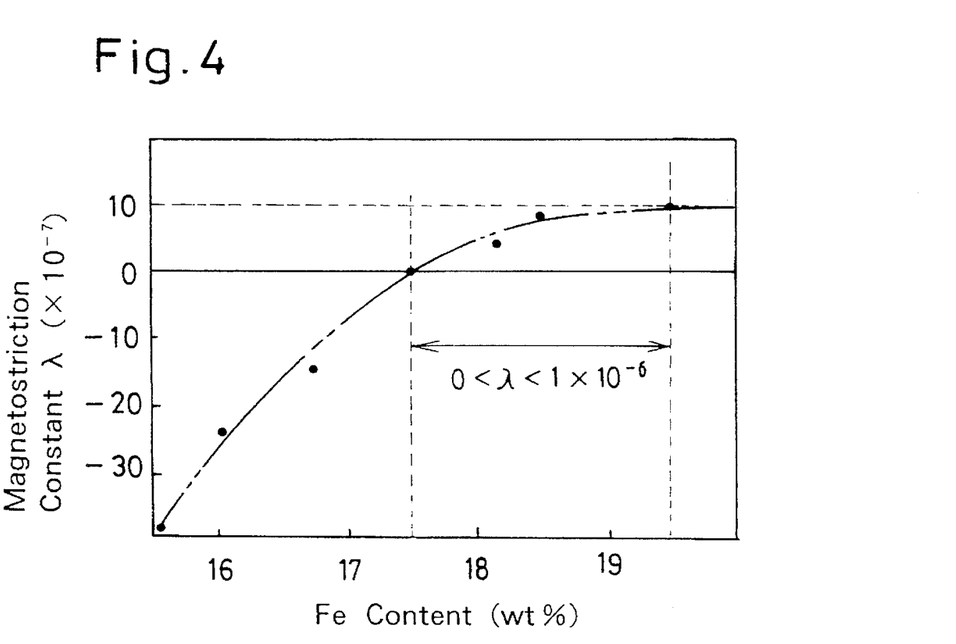
FIG. 4 is a graph showing the relationship between the Fe content of NiFe magnetic thin films of the invention and the magnetostriction constant thereof.

FIG. 4 is a diagram showing the relationship between the Fe content and the magnetostriction constant as determined for NiFe magnetic thin films formed by the magnetic field sputtering process. FIG. 4 reveals that when the Fe content of the NiFe magnetic thin film is in the range of 17.5 to 19.5 wt. %, the thin film has a positive magnetostriction constant of up to $1\times10^{-6}$. The magnetic thin film has a negative magnetostriction constant when the Fe content is less than 17.5 wt. %.

Next, magnetic core layers each formed on a substrate of crystallized glass by the magnetic field sputtering process were checked for magnetic domain structure by the Bitter method using a colloid.

Figure 5A:
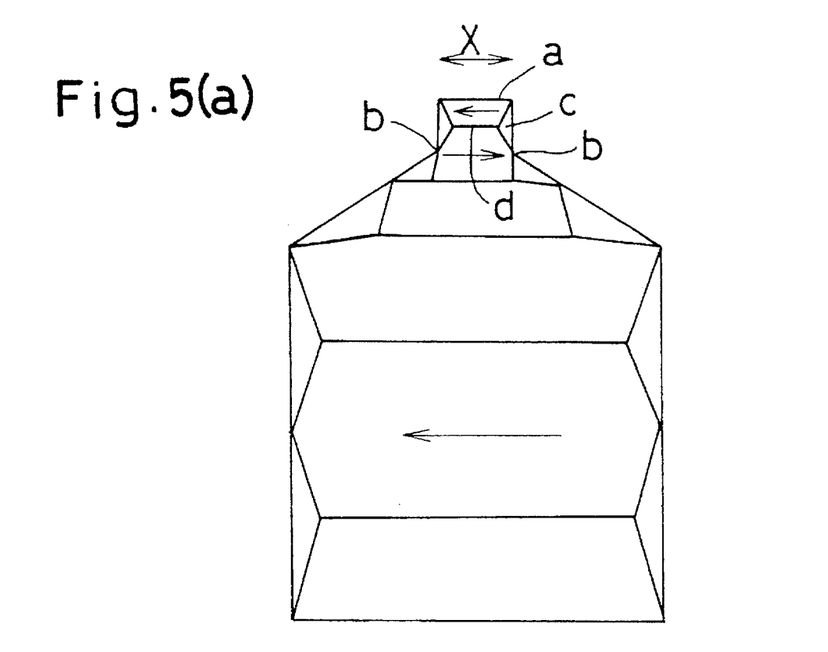

FIG. 5, (a) shows the structure of magnetic core layer comprising an NiFe magnetic thin film which is 17.5 to 19.5 wt. % in Fe content, that is, which has a positive magnetostriction constant of not greater than $1\times10^{-6}$. The direction of easy axis of magnetization in a core tip region c from a core tip a to a portion b increasing in core width is parallel to the direction X of track width as indicated by an arrow. The core tip region c then has a 180° domain wall present over a major portion of the width of the region c, hence a structure approximate to a single-domain structure.

Figure 5B:
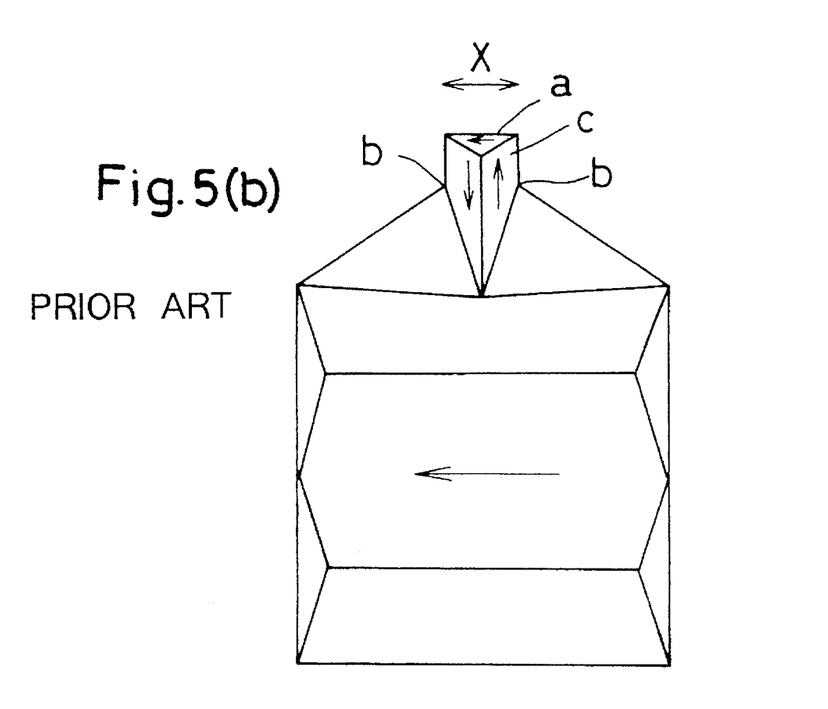

FIG. 5, (b) shows the domain structure of magnetic core layer comprising an NiFe magnetic thin film which is less than 17.5 wt. % in Fe content, i.e., which has a negative magnetostriction constant. The direction of easy axis of magnetization in the core tip region c is orthogonal to the direction X of track width as indicated by an arrow. The magnetic permeability at 1 MHz of NiFe magnetic thin films formed by the magnetic field sputtering process is about 2000 in the direction of hard axis of magnetization and about 200 along the direction of easy axis of magnetization.

More specifically with the magnetic core layer having the domain structure shown in FIG. 5, (a), the direction of easy axis of magnetization in the core tip region c is parallel to the track width direction X, so that a magnetic flux flows along the direction of hard axis. Further because the 180° domain wall is present over a major portion of widthwise direction of the core tip region c, the region is small in magnetic resistance and less liable to magnetic saturation. With the magnetic core layer having the domain structure shown in FIG. 5, (b), the direction of easy axis of magnetization in the core tip region c is orthogonal to the track width direction X, so that the magnetic flux flows along the direction of easy axis. The region therefore has great magnetic resistance and is liable to magnetic saturation.

Thus, the magnetic core layer comprising a magnetic thin film of NiFe., which is 17.5 to 19.5 wt. % in Fe content, i.e., which is positive and up to $1\times10^{-6}$ in magnetostriction constant, has the domain structure shown in FIG. 5, (a) and is less susceptible to magnetic saturation in the core tip region c. On the other hand, the magnetic core layer comprising a magnetic thin film of NiFe which is below 17.5 wt. % in Fe content, i.e., which is negative in magnetostriction constant, has the domain structure shown in FIG. 5, (b) and is liable to magnetic saturation in the core tip region c.

Figure 6:
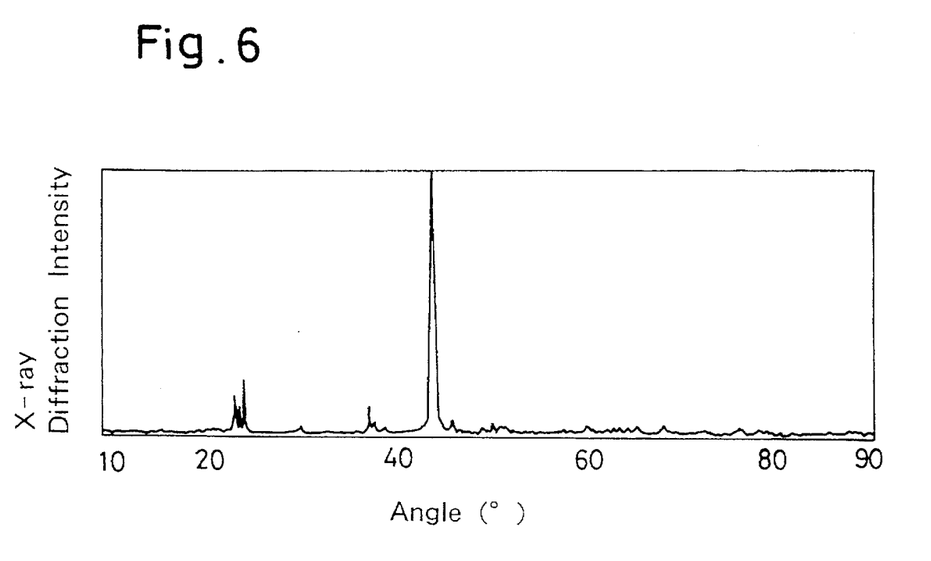
FIG. 6 is a graph showing the result obtained by X-ray diffractiometry of the NiFe magnetic thin film of the invention.

The magnetic thin film of NiFe formed by the magnetic field sputtering process was checked by X-ray diffractiometry with the result shown in FIG. 6. FIG. 6 reveals that the NiFe magnetic thin film is found to have a peak at 44.1° by the X-ray diffractiometry using Cu Kα, has an fcc structure wherein the (111) planes are arranged in parallel to the film surface and is oriented along <111>. The peaks of FIG. 6 except at 44.1° are due to the substrate of crystallized glass.

Figure 7:
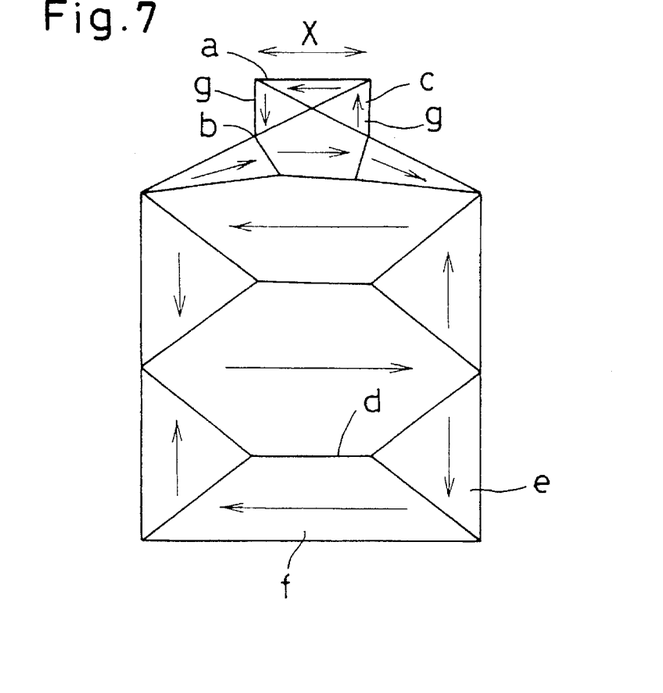
FIG. 7 is a plan view showing the magnetic domain structure of magnetic core layer of a first embodiment.

When the thin film magnetic head of the first embodiment described has a track width of about 10 μm, the magnetic core layer can be prevented from magnetic saturation, whereas when the track width decreases to not greater than 6 μm, the magnetic core layer has a different domain structure as shown in FIG. 7. In the core rear region e of the illustrated structure, 180° magnetic domains f wherein the easy axis of magnetization is parallel to the track width direction X are predominant, with many 180° domain walls f present, but the core tip region c preferentially has 90° magnetic domains g wherein the easy axis is orthogonal to the track width direction X, with no 180° domain wall present. The core tip region c is therefore great in magnetic resistance and liable to magnetic saturation.

A thin film magnetic head of second embodiment will be described below which has such a structure that even when the track width is still smaller, the magnetic core layer is less susceptible to magnetic saturation than in the first embodiment.

Like the first embodiment, the magnetic head of the second embodiment has the structure shown in FIG. 1, in which the lower magnetic core layer 9 and the upper magnetic core layer 12 each comprise a CoZr amorphous magnetic thin film formed by sputtering in a magnetic field. As shown in FIG. 2, the protective layer 14 has as an internal stress a compressive stress of less than $10\times10^8$ dyne/cm² remaining therein.

To check the lower magnetic core layer 9 and the upper magnetic core layer 12 for domain structure, CoZr amorphous magnetic thin films having the same configuration as the lower and upper core layers 9, 12 were each formed on a crystallized glass substrate by sputtering in a magnetic field. At this time, the external magnetic field was 70 Oe, substrate temperature was 200° C., and Ar gas pressure was 3 mTorr. The CoZr amorphous magnetic thin films thus formed were heat-treated at 200° C. for 1 hour using a rotating magnetic field and static magnetic field of 400 Oe in various different combinations to alter the anisotropic magnetic field Hk of the films. In the present invention, the magnetic field intensity at a point where a tangent to the magnetization curve in the direction of hard axis at the origin thereof reaches a saturation magnetic flux density is taken as the anisotropic magnetic field Hk.

Next, the CoZr amorphous magnetic thin films prepared by the above process were checked for domain structure by the Bitter method. Consequently, the domain structure shown in FIG. 8 was obtained in the case where the track width is not smaller than 3 μm.

Figure 8:
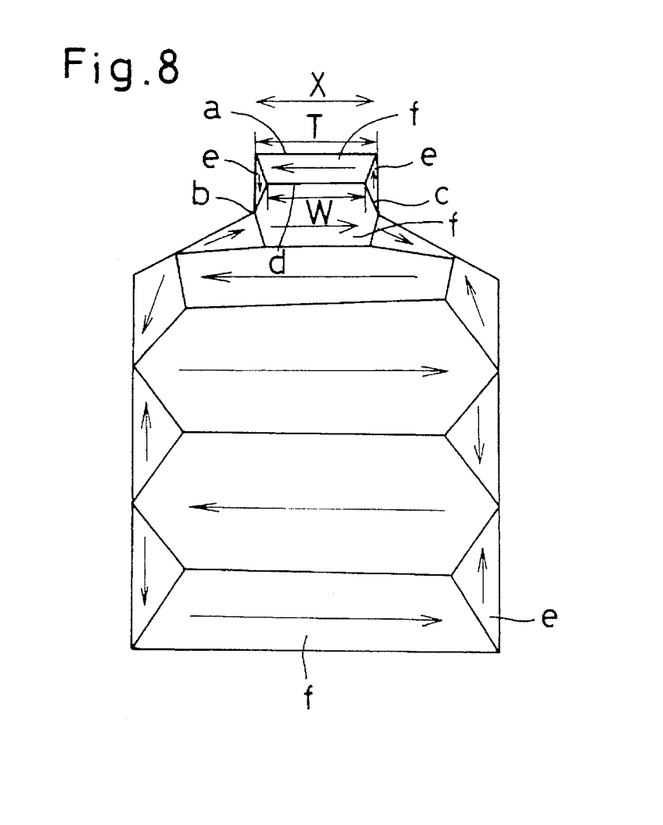
FIG. 8 is a plan view showing the magnetic domain structure of magnetic core layer of a second embodiment.

With the magnetic core layer comprising the CoZr amorphous magnetic thin film shown in FIG. 8, not only the core rear region e but also the core tip region c preferentially has 180° magnetic domains f wherein the easy axis is parallel to the track width direction X and includes 180° domain walls d. The magnetic core layer then has a saturation magnetic flux density of 1.55 T and a positive magnetostriction constant of $1.6\times10^{-6}$ in absolute value.

Figure 9:
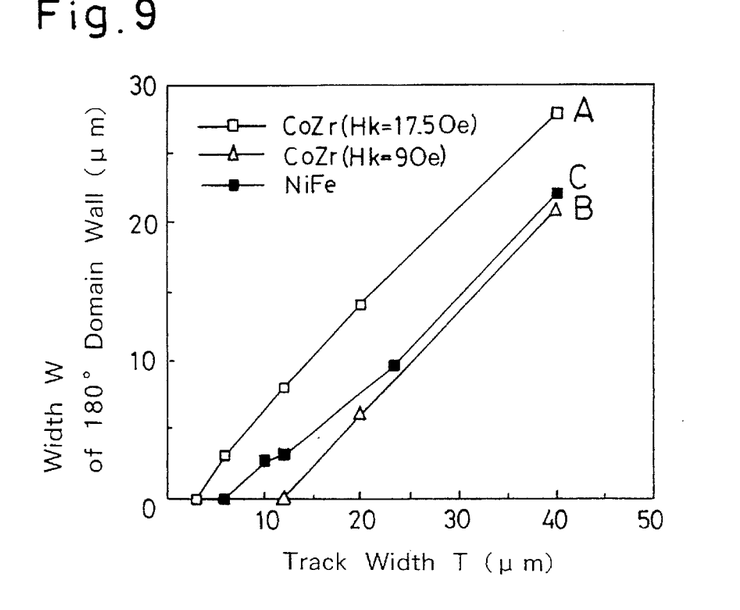
FIG. 9 is a graph showing the relationship between the track width of the magnetic core layer and the width of a 180° domain wall in the tip region thereof.

Next, a magnetic core layer A comprising one of the above CoZr amorphous magnetic thin films which was 17.5 Oe in anisotropic magnetic field Hk, a magnetic core layer B comprising another one of the CoZr magnetic thin film which was 9 Oe in anisotropic magnetic field Hk and a magnetic core layer C comprising the NiFe magnetic thin film of the first embodiment were checked for the relationship between the track width T and the width W of 180° domain wall d in the core tip region. FIG. 9 shows the result. The core layer A is a sample heat-treated in the static magnetic field only, and the core layer B is a sample heat-treated in the rotating magnetic field only.

As will be apparent from FIG. 9, at the same track width T, the core layer B comprising the CoZr amorphous magnetic thin film which is 9 Oe, smaller than 10 Oe, in anisotropic magnetic field Hk is smaller than the core layer C of the first embodiment comprising the NiFe magnetic thin film in the width W of the 180° domain wall, but the core layer A comprising the CoZr amorphous magnetic thin film which is 17.5 Oe, greater than 10 Oe, in anisotropic magnetic field Hk is exceedingly greater than the core layers B, C in the width W of the 180° domain wall, this indicating presence of the 180° domain wall even when the track width T is smaller than 6 μm.

Figure 10:
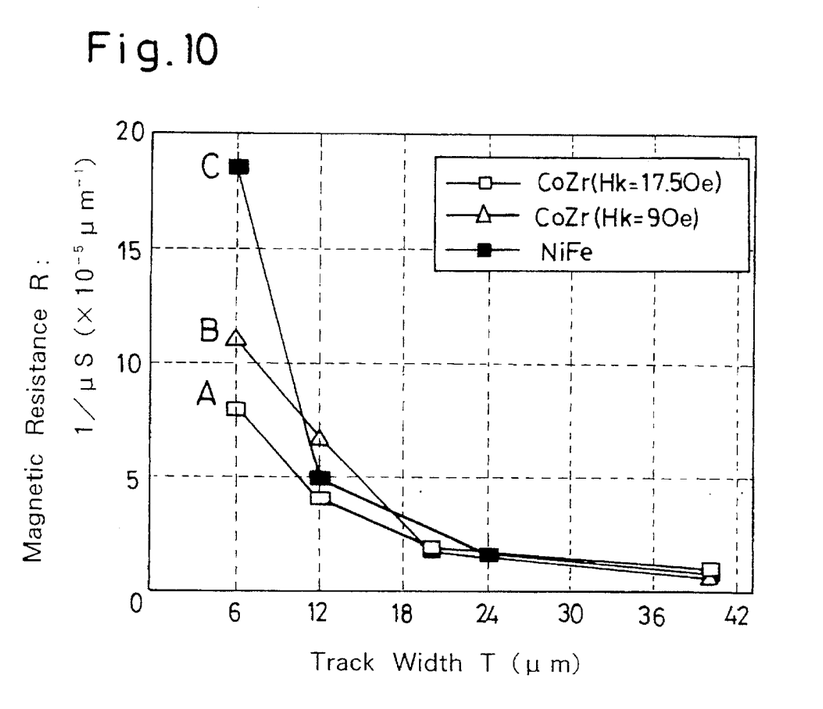
FIG. 10 is a graph showing the relationship between the track width of the magnetic core layer and the magnetic resistance thereof.

The magnetic core layers A, B and C were further checked for the relationship between the track width T and the magnetic resistance R of the core tip region with the result given in FIG. 10. The magnetic resistance R is a magnetic resistance value per meter. The magnetic resistance at the 180° domain wall f and that at 90° domain wall e were taken.

As will be apparent from FIG. 10, the core layers A, B, C have nearly the same resistance R at great track widths T, and all increase greatly in resistance R as the track width T decreases, whereas the core layer A is smaller than the core layers B, C in the rate of increase in resistance R.

As will be apparent from the foregoing, the magnetic core layer A which is 17.5 Oe, smaller than 10 Oe, in anisotropic magnetic field Hk is lesser than the core layers B, C in the decrease of the width W of the 180° domain wall in the core tip region c and can therefore be held low in magnetic resistance and less susceptible to magnetic saturation even when reduced in track width.

Figure 11:
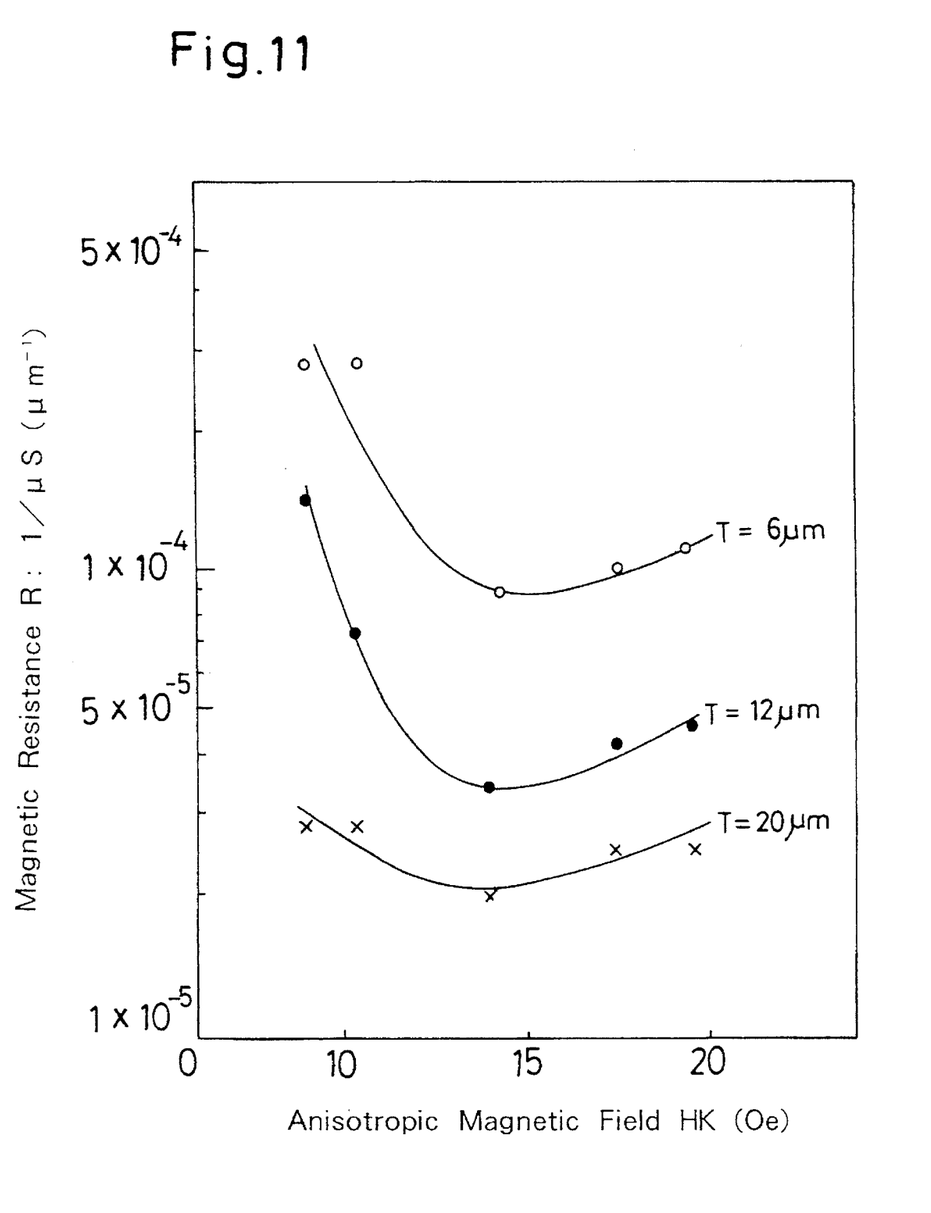
FIG. 11 is a graph showing the relationship between an anisotropic magnetic field Hk of a magnetic core layer formed by a CoZr amorphous magnetic thin film and the magnetic resistance thereof.

Next, magnetic core layers comprising the foregoing CoZr amorphous magnetic thin film and respectively 6 μm, 12 μm and 20 μm in track width T were checked for the relationship between the anisotropic magnetic field Hk and the magnetic resistance. FIG. 11 shows the result.

FIG. 11 reveals that regardless of the track width T, the magnetic resistance R decreases when the anisotropic magnetic field Hk is not smaller than 10 Oe, and this tendency becomes pronounced when the track width T is smaller, i.e., 6 μm and 12 μm. The resistance R is especially small when the field Hk is 13 to 20 Oe, and is minimum at 14 Oe.

As described above, the magnetic core layer comprising the CoZr amorphous magnetic thin film which is at least 10 Oe, especially in the range of 13 to 20 Oe, in anisotropic magnetic field has a domain structure as shown in FIG. 8 and is less prone to magnetic saturation in the core tip region c even if the track width is as small as about 6 μm.

The same effects as above were available with magnetic core layers formed by a CoZr amorphous magnetic thin film having Sn incorporated therein, i.e., by a CoZrSn amorphous magnetic thin film.

Thus, the present invention provides thin film magnetic heads wherein the core tip region of its magnetic core layer is less susceptible to magnetic saturation and which are suited to high-density recording.

The foregoing description of embodiments is intended to illustrate the present invention and should not be interpreted as limiting the invention as defined in the appended claims or restricting the scope thereof. The construction of the devices of the invention is not limited to those of the above embodiments but can of course be modified variously within the technical scope set forth in the claims.

What is claimed is:

1. A thin film magnetic head comprising a lower magnetic core layer and an upper magnetic core layer formed over the lower core layer with a coil layer, a gap spacer layer and an insulating layer provided therebetween, at least one of the lower magnetic core layer and the upper magnetic core layer having a core tip region between a core tip and a portion increasing in core width, the core tip region having a track width of not greater than 6 μm, the magnetic core layer with the core tip region being formed by a CoZr amorphous magnetic thin film having an anisotropic magnetic field of at least 10 Oe.

2. A thin film magnetic head as defined in claim 1 wherein the anisotropic magnetic field is in the range of 13 to 20 Oe.

3. A thin film magnetic head as defined in claim 2 wherein the core tip region has a 180° domain wall.

4. A thin film magnetic head having an inductive head portion for recording use only, the inductive head portion comprising a lower magnetic core layer and an upper magnetic core layer formed over the lower core layer with a coil layer, a gap spacer layer and an insulating layer provided therebetween, at least one of the lower magnetic core layer and the upper magnetic core layer having at least a core tip region between a core tip and a portion increasing in core width, the core tip region having a track width of not greater than 6 μm, the magnetic core layer with the core tip region being formed by CoZr amorphous magnetic thin film having an anisotropic magnetic field of at least 10 Oe.

5. A thin film magnetic head as defined in claim 4 wherein a magnetoresistive head portion for reproduction use only is formed on the inductive head portion.

* * * * *